Jan. 16, 1968  G. TITT  3,363,733

OVERRUNNING CLUTCH

Filed Aug. 23, 1965

1

3,363,733
OVERRUNNING CLUTCH
Georg Titt, Nuremberg, Germany, assignor to Georg Muller Kugelfabrik KG, Nuremberg, Germany
Filed Aug. 23, 1965, Ser. No. 482,335
10 Claims. (Cl. 192—45.1)

ABSTRACT OF THE DISCLOSURE

An overrunning clutch having inner and outer rotary clutch members which define between themselves an annular space in which a plurality of motion-transmitting bodies are situated for tilting movement between clamped positions where these bodies are respectively clamped between the clutch members for transmitting rotary motion therebetween and unclamped positions where the bodies are respectively in positions permitting free rotary movement of one of the clutch members relative to the other. An annular cage is situated in the latter space and is respectively formed with a plurality of openings through which the above bodies respectively extend, so that the cage determines the circumferential distribution of the bodies in this space. A plurality of individual springs respectively engage these bodies and urge them to predetermined positions, respectively, relative to the cage, and these plurality of individual springs all form portions of a continuous, one-piece meander-shaped springy wire.

---

The present invention relates to clutches.

More particularly, the present invention relates to overrunning clutches of the type where tiltable motion-transmitting bodies are situated between the inner and outer rotary clutch members for tilting movement between clamped positions where these bodies transmit the motion between the clutch members and unclamped positions where one of the clutch members can turn freely relative to the other of the clutch members.

It is conventional in clutches of this type to provide in the annular space between the clutch members a cage having openings which receive the motion-transmitting bodies so that in this way they will be maintained in a circumferential row in the space between the clutch members. Initially these bodies are loosely positioned between the clutch members in the openings of the cage, and then a suitable spring means is associated with these bodies so as to press them against each other and cause them to bear with a light friction against the rotary clutch members which can slip with respect to these bodies except when the latter have tilted to their clamped positions for transmitting motion between the clutch members. The cage itself, according to a further conventional construction, can be made of a light, easily bendable spring band so that in this way the cage can be provided in the openings thereof which receive the bodies with springy projections which respectively engage the motion-transmitting bodies for yieldably maintaining them in a position ready to be tilted to their clamped positions for transmitting rotary motion between the clutch members.

One of the primary drawbacks of these conventional clutch structures is that they operate too sluggishly for many purposes. For example where a high speed rotary drive must be very quickly reversed in a fraction of a second, clutches of the above type are incapable of fulfilling the requirements in the small amount of time available. For example, in certain switching mechanisms which are required to operate at high frequencies the known overrunning clutches do not permit the desired high frequency of the switching operations to be achieved. Experience has shown that with the known structures the motion-transmitting bodies which engage each other, quite apart from the drawbacks with respect to the complex configurations and arrangements of a large number of small components, cannot be reliably maintained in uniform positions for producing a uniform reliable action all around the circumference of the rotary clutch members. Moreover, the spring action which can be achieved with the known structures is of a stiff relatively short-stroke type providing only a hard spring action for the individual motion-transmitting bodies. In addition, it is essential with the conventional structures to provide motion-transmitting bodies and guide elements therefor which are necessarily of a relatively large size so that it is only possible to accommodate a limited number of motion-transmitting bodies circumferentially around the axis of the clutch. Therefore, the bodies of the known structures provide unavoidable delays in the engagement and disengagement of the clutch due simply to the relatively large masses which must be accelerated, so that the known overrunning clutches are suitable only within certain limited speeds of rotation and frequencies of operation.

It is accordingly a primary object of the present invention to provide an overrunning clutch which can very reliably operate at a much greater speed than has heretofore been possible for providing engagement and disengagement of the clutch in an extremely small fraction of a second whenever a high speed rotary movement is reversed, and of course it is also an object of the invention to provide an overrunning clutch which can very reliably be used with switching mechanisms which operate at very high frequencies.

In particular, it is an object of the invention to provide an overrunning clutch which can accommodate a relatively large number of relatively small motion-transmitting bodies arranged in a circumferential row about the axis of the clutch while at the same time guaranteeing the most accurate positioning of these motion-transmitting bodies for tilting movement between their clamped, motion-transmitting positions and unclamped, non-motion-transmitting positions.

Also, the objects of the present invention include the provision of an overrunning clutch which has in engagement with the motion-transmitting bodies a plurality of spring means, respectively, which are capable of carrying out relatively long springy movements to provide a soft springy action in one position of the bodies, namely the clamped positions thereof, respectively, so as to maintain the bodies in this way at predetermined positions relative to the cage while motion is transmitted through the bodies between the clutch members.

In addition, the objects of the present invention include an overrunning clutch where the characteristics of the spring action are automatically altered depending upon the positions of the motion-transmitting bodies. Thus, it is an object of the invention to provide a spring means which when the bodies are in one of their primary positions, namely the clamped positions thereof, will provide a relatively soft spring action while when the bodies are in their unclamped positions, where the clutch is released, will provide a hard, stronger spring force so as to maintain the motion-transmitting bodies in readiness for an extremely fast and sudden snapping into their clamped positions to provide engagement of the clutch in the shortest possible time. Thus, because of the relatively light, soft spring force which is achieved with the structure of the invention when the motion-transmitting bodies are in their clamped positions, there is no frictional rubbing between the clutch members and the motion-transmitting bodies so that undesirable slippage between the bodies and the clutch members is reliably avoided with the structure of the invention. On the other hand, the relatively hard, stronger spring force achieved with the structure of the invention when the motion-transmitting bodies are in their unclamped positions on the one hand prevents these bodies from moving to an undesirably great extent when tilting between their positions and on the other hand guarantees an extremely speedy engagement of the clutch when the drive is reversed and it is desirable to provide transmission of motion between the clutch members in the shortest possible period of time. Thus, with the structure of the invention it cannot happen that the motion-transmitting bodies snap out of the space between the clutch members when the direction of rotation is reversed.

It is furthermore an object of the invention to provide a clutch structure capable of accomplishing all of the above objects with an exceedingly simple inexpensive structure which occupies a small amount of space and which is made up of an extremely small number of components of relatively light weight and very hard wearing properties, so that a long life of reliable operation is assured for the clutch of the invention.

The clutch of the invention includes in the annular space between the inner and outer clutch members a plurality of tiltable motion-transmitting bodies which are tiltable between clamped positions where they are clamped between the clutch members to transmit rotary motion therebetween and unclamped positions where one of the clutch members can turn freely relative to the other of the clutch members. An annular cage means is situated in the space between the clutch members and is formed with openings through which the bodies extend, and in accordance with the invention there are also situated in the space between the clutch members a plurality of individual spring means which respectively engage the motion-transmitting bodies for yieldably urging the latter to predetermined positions, respectively, relative to the cage means.

The invention is illustrated by way of example in the accompanying drawings which form part of the application and in which.

Figure 3:
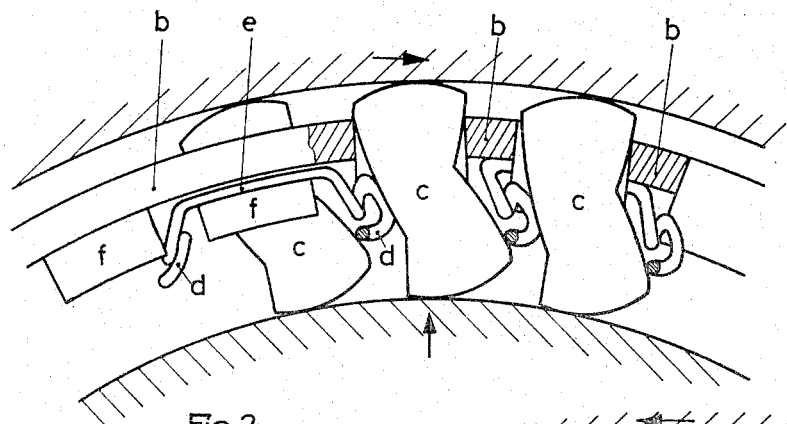
Figure 4:
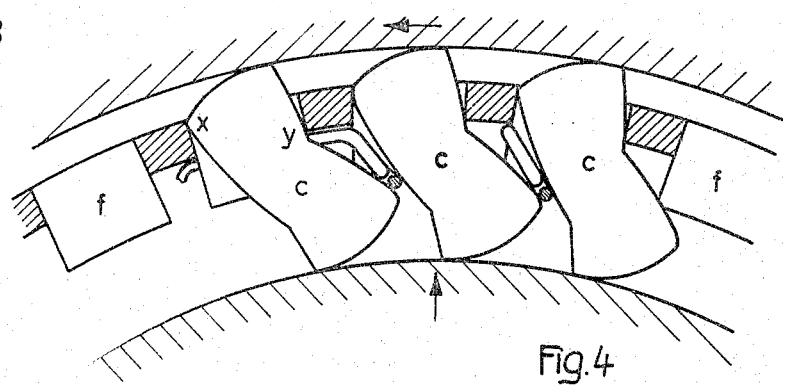

FIG. 3 is a fragmentary sectional elevation taken in a plane normal to the clutch axis and showing fragmentarily the inner and outer clutch members as well as part of the structure of the invention situated in the space therebetween, the motion-transmitting bodies being shown in FIG. 3 in their clamped positions where they transmit motion between the clutch members so that the clutch is shown in its engaged position in FIG. 3; and FIG. 4 shows the clutch of FIG. 3 in its disengaged position where the motion-transmitting bodies are in their unclamped positions, respectively.

Figure 1:
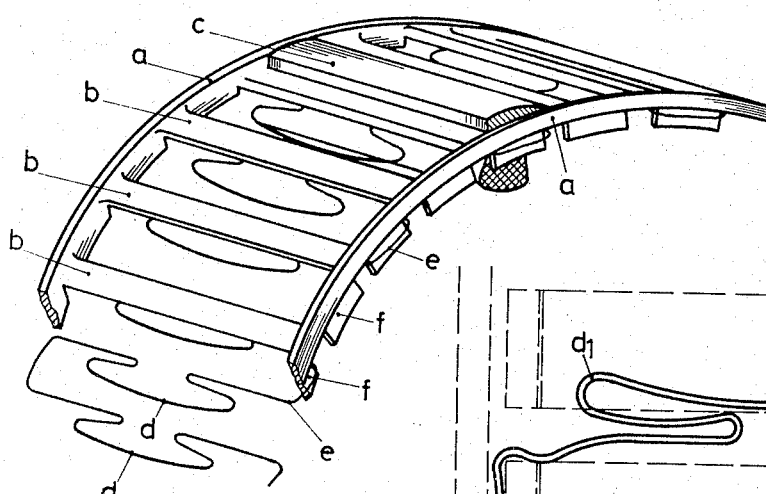
FIG. 1 is a fragmentary perspective illustration of that part of the structure of the invention which is situated in the annular space between the clutch members.

Referring now to the drawings, there is fragmentarily illustrated therein a cage means which is made up of a pair of end rings $a$ which are coaxial and of the same diameter and which are interconnected by axially extending bars $b$. As is indicated in FIG. 1, the end rings $a$ and the axially extending bars $b$ may all be formed integrally from a suitable metal blank. The circumferential spacing of the bars $b$ around the common axis of the rings $a$ defines between the rings $a$ and the bars $b$ a plurality of openings which are adapted respectively to receive the motion-transmitting bodies $c$ which initially extend loosely through the several openings of the cage means $a$, $b$. These motion-transmitting bodies $c$ have the configuration which is most clearly apparent from FIGS. 1, 3 and 4, and they may be made of any suitable plastic or composition, such as rubber, hard rubber, or any other suitable friction-resistant and partly resilient material well known in the art. The motion-transmitting bodies $c$ have a uniform cross sectional configuration as indicated in FIGS. 3 and 4, and they are elongated and extend substantially all the way across the space between the end rings $a$ in the several openings defined between the bars $b$. At their inner peripheries the end rings $a$ of the cage means carry inwardly directed substantially radial tongues $f$ which are circumferentially distributed about the axis of the clutch and which serve to mount the meander-shaped springy wire $e$ on the cage means in the manner shown most clearly in FIGS. 1 and 2.

Figure 2:
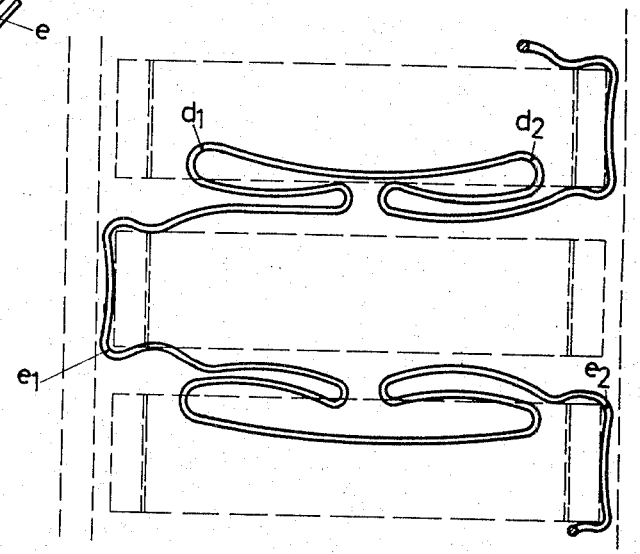
FIG. 2 is a fragmentary top plan view showing part of the elongated wire of the invention which is shaped to provide the spring means of the invention, the cage structure which cooperates with the wire being shown in dotted lines in FIG. 2.

As is apparent from FIGS. 1 and 2 the springy wire $e$ extends around and engages a tongue of one end ring $a$ and then extends between a pair of motion-transmitting bodies to extend around a tongue at the next ring from which the wire then extends between the next pair of motion-transmitting bodies, and so on, so that in this way the elongated one-piece wire will extend back and forth between the ends of the cage means and between the bodies $c$. The springy wire $e$ resiliently grips the tongues $f$ at the opposed ends of the cage means to be supported on these tongues.

Between each pair of successive bodies $c$ the wire $e$ has an elongated, bowed springy portion $d$, and the successive bowed elongated springy wire portions $d$ respectively form a plurality of individual spring means which respectively engage and press against the bodies $c$ so as to urge the latter against one of the edges of the several bars $b$ of the cage means $a$, $b$. As is apparent particularly from FIGS. 1, 3, and 4, the plurality of spring means $d$ are situated between the axis of the clutch and the several openings of the cage through which the bodies $c$ respectively pass, and in addition these spring means $d$ extend substantially radially in toward the axis of the clutch. As is apparent from FIGS. 3 and 4, each body $c$ is situated between a pair of the spring means $d$ and are held by the spring means yieldably and resiliently in positions where the bodies $c$ engage the bars $b$ of the cage means.

As may be seen from FIG. 2 in particular, the wire $e$ is stressed by the bodies $c$ to a position different from that which the wire assumes when it is unstressed. The upper portion of FIG. 2 illustrates the condition which the wire has between a pair of successive bodies $c$, while the lower portion of FIG. 2 indicates the configuration of the wire in its unstressed condition where there are no motion-transmitting bodies between which the wire extends. At the left portion of FIG. 3 a part of the wire is shown in the position it takes when unstressed by engagement with any motion-transmitting body, while to the right of the leftmost part of the wire shown in FIG. 3 are illustrated several portions of the wire respectively situated in the spaces between the successive motion-transmitting bodies $c$. Thus, FIG. 3 clearly illustrates how the springy wire portions $d$ are deflected to the right, as viewed in FIG. 3 for the portion of the wire illustrated therein. The wire is deflected and stressed to a greater extent in the condition thereof indicated in FIG. 4. The clutch is shown in FIG. 3 in its engaged position where motion is transmitted between the inner and outer clutch members and in this position because the wire $e$ is stressed to a relatively small extent the springy portions $d$ provide a relatively light spring force against the bodies $c$. However, in the disengaged position of the clutch shown in FIG. 4 the several bodies $c$ have tilted in a counter-clockwise direction from the position of FIG. 3 into the position of FIG. 4 with the result that the spring means situated between the several bodies has been deflected to an even greater extent and is further stressed providing a stronger and harder spring force acting against the bodies $c$ to tend to urge them to the tilted positions of FIG. 3 where they are clamped between the clutch members for transmitting motion therebetween. In the unclamped position of FIG. 4 the clutch members are freely rotatable one relative to the other and will slip with respect to the bodies c.

When the direction of rotation of the outer clutch member changes from that of FIG. 3 to that of FIG. 4 so as to disengage the clutch, there is a very sudden and sharp increase in the stressing of the spring means, and the extent to which the spring means is stressed is particularly apparent from FIG. 2 which shows at its upper portion the spring means in the condition it takes between a pair of bodies having the unclamped position shown in FIG. 4. In the normal engaged position of the clutch shown in FIG. 3, the entire length of the wire between a pair of bodies, extending from the portion e1 to the portion e2 (FIG. 2) is available for springy action, so that a relatively soft spring force providing a relatively long path of movement for the bowed portion d is provided. However, when the clutch becomes disengaged so as to assume the position of FIG. 4, the several axially extending portions of the wire spring which are respectively situated between the bodies become deflected to a greater extent and in fact become clamped between the successive bodies, as indicated in FIG. 4, so that at this time the spring portions are engaged at the points d1 and d2 between the successive bodies, thus reducing the effective length of the spring to the bowed portion thereof extending from d1 to d2, indicated in FIG. 2, and therefore at this time there is a correspondingly stronger and harder spring force absorbing the stresses applied by the bodies c when they snap to the disengaged position of FIG. 4 and urging these bodies with this more powerful harder spring force to snap back to the position of FIG. 3 when the direction of rotation is again reversed so as to provide an extremely rapid clutch engagement and disengagement. It is to be noted from a comparison of the upper and lower portions of FIG. 2 that the bowed portion of the wire is curved out of the configuration which it assumes when unstressed, so that this bowed portion is distorted by the bodies to provide the more powerful spring force in the disengaged position of the clutch.

It is to be noted also from FIG. 4 that in the disengaged position of the clutch while the clutch members can slip freely with respect to the bodies these bodies c themselves are arrested in their tilting movement by engagement wiht the outer edges X and inner edges Y of the cage openings through which the bodies c extend. As is particularly apparent from the drawings, the elongated springy wire e first extends from one of the tongues f only part of the way transversely across the space between the ends of the cage and is then bent back upon itself to be joined with one end of the bowed spring means d which then extends across the space between the ends of the cage to form the junction with another end of a portion of the wire e which is bent back upon itself before reaching the next tongue f at the other end of the cage from where the wire e then progresses in the same way but in the opposite axial direction back to the next tongue f at the opposite end of the cage, and so on. In this way the bowed springy portions d are connected with the portions of the wire e which respectively engage the tongues f through portions of the wire e which are bent back upon themselves to form a plurality of torsion means capable of being twisted from the position shown at the lower part of FIG. 2 into the position shown at the upper part of FIG. 2, so that this torsion means also acts on the bowed springy portions d not only to carry the latter but also to urge the latter to press against the bodies c.

It is therefore apparent that with the structure of the invention a substantially one-piece cage means is formed with the openings which receive the several motion-transmitting bodies. Moreover, this cage means is relatively rigid and carries the spring structure of the invention which is formed only by a single length of meander-shaped wire as described above. Therefore, the clutch of the invention includes an extremely small number of simple rugged elements which are light in weight and occupy a small amount of space while at the same time enabling a relatively large number of small motion-transmitting bodies to be distributed circumferentially along the space between the clutch members. At the same time these motion-transmitting bodies are uniformly acted upon to provide a uniform action circumferentially along the clutch as well as an extremely rugged engagement and disengagement of the clutch with a minimum amount of frictional rubbbing between the parts.

What is claimed is:

1. In an overrunning clutch, inner and outer rotary clutch members defining between themselves an annular space, a plurality of motion-transmitting bodies situated in said annular space for tilting movement therein between clamped positions where said bodies are respectively clamped between said clutch members for transmitting rotary motion therebetween and unclamped positions where said bodies are respectively in positions permitting free rotary movement of one of said clutch members relative to the other, annular cage means situated in said space and respectively formed with a plurality of openings through which said bodies respectively extend so that said cage means determines the circumferential distribution of said bodies in said space, and a plurality of individual spring means respectively engaging said bodies and urging the latter to predetermined positions, respectively, relative to said cage means, said plurality of individual spring means respectively forming portions of a continuous, one-piece meander-shaped springy wire.

2. In an overrunning clutch, inner and outer rotary clutch members defining between themselves an annular space, a plurality of motion-transmitting bodies situated in said annular space for tilting movement therein between clamped positions where said bodies are respectively clamped between said clutch members for transmitting rotary motion therebetween and unclamped positions where said bodies are respectively in positions permitting free rotary movement of one of said clutch members relative to the other, annular cage means situated in said space and respectively formed with a plurality of openings through which said bodies respectively extend so that said cage means determines the circumferential distribution of said bodies in said space, and a plurality of individual spring means respectively engaging said bodies and urging the latter to predetermined positions, respectively, relative to said cage means, said plurality of individual spring means respectively forming portions of a meander-shaped springy wire, said cage means having a pair of opposed ends each of which is provided with a plurality of substantially radially-extending tongues, and said wire passing first around a tongue at one end of said cage means and then around a tongue at the other end of said cage means, and so on, back and forth between said tongues to define said plurality of individual spring means therebetween, and said wire being supported by said tongues.

3. In a clutch as recited in claim 2, said wire having between said tongues a plurality of bowed portions respectively engaging said bodies and forming said plurality of individual spring means.

4. In a clutch as recited in claim 3, said bowed portions of said wire being clamped between said bodies when the latter are in their unclamped positions and being deflected by said bodies, when the latter move from said clamped to said unclamped positions thereof, respectively, to positions where the effective length of each spring means is reduced as compared to the effective length thereof when said bodies are in their clamped positions, respectively.

5. In an overrunning clutch, inner and outer rotary clutch members defining between themselves an annular space, a plurality of motion-transmitting bodies situated in said annular space for tilting movement therein between clamped positions where said bodies are respectively clamped between said clutch members for transmitting rotary motion therebetween and unclamped positions where said bodies are respectively in positions permitting free rotary movement of one of said clutch members relative to the other, annular cage means situated in said space and respectively formed with a plurality of openings through which said bodies respectively extend so that said cage means determines the circumferential distribution of said bodies in said space, and a plurality of individual spring means respectively engaging said bodies and urging the latter to predetermined positions, respectively, relative to said cage means, said bodies respectively acting on said plurality of spring means to provide one spring force when said bodies are in their clamped positions, respectively, and another spring force when said bodies are in their unclamped positions, respectively.

6. In a clutch as recited in claim 5, said bodies acting on said plurality of individual spring means to respectively reduce the effective length thereof and provide a relatively hard powerful spring force when said bodies are in their unclamped positions while when said bodies are in their clamped positions they act on said plurality of spring means, respectively, to provide a relatively long effective spring length for said plurality of spring means with a relatively soft spring action.

7. In an overrunning clutch, inner and outer rotary clutch members defining between themselves an annular space, a plurality of motion-transmitting bodies located in said space and distributed circumferentially therealong, said bodies being tiltable between clamped positions, respectively, where said bodies transmit rotary motion between said clutch members and an unclamped position where one of said clutch members is freely turnable relative to the other, annular cage means situated in said space and respectively formed with openings through which said bodies pass, said cage means determining the circumferential distribution of said bodies in said space, a plurality of elongated springy wire portions of bowed configuration respectively engaging said bodies for urging the latter to tilt toward said clamped positions thereof, respectively, and a plurality of springy torsion means carried by said cage means and respectively carrying said springy wire portions for respectively urging the latter against said bodies, said bodies when tilting from their clamped to their unclamped positions deflecting said springy wire portions in opposition to said plurality of springy torsion means to positions where a greater spring force acts on said bodies than when the latter are in their clamped positions.

8. In a clutch as recited in claim 7, said plurality of springy torsion means forming extensions of said springy wire portions and all of said springy wire portions and torsion means forming a single length of meander-shaped wire which extends back and forth across said cage means respectively between said bodies.

9. In a clutch as recited in claim 8, said cage means having a pair of opposed ends respectively provided with substantially radial tongues around which said wire extends and on which said wire is supported.

10. In a clutch as recited in claim 9, said wire extending from one tongue at one end of said cage means part of the way across the latter between a pair of said bodies and then being bent back upon itself to form part of a torsion means and said portion of said wire which is bent back upon itself being connected to one end of the bowed wire portion which is between said pair of bodies, the other end of said bowed portion being connected to a part of said wire which is also bent back upon itself before passing around a tongue at the other end of said cage means, and said wire being identically bent between successive bodies but extending first in one direction between said bodies and then in an opposite direction therebetween from one end toward the other end of said cage means with said wire having between each pair of successive bodies a pair of portions respectively bent back upon themselves to form said torsion means and between said bent-back portions an elongated bowed portions directly engaging one of said bodies.

References Cited
UNITED STATES PATENTS

| | | | |
|---|---|---|---|
| 2,824,635 | 2/1958 | Troendly et al. | 192—45.1 |
| 2,940,567 | 6/1960 | Dodge | 192—45.1 |
| 3,049,206 | 8/1962 | Zlotek | 192—45.1 |
| 3,066,779 | 12/1962 | Maurer et al. | 192—45.1 |
| 3,124,228 | 3/1964 | Candela | 192—45.1 |

DONLEY J. STOCKING, *Primary Examiner.*

ARTHUR T. McKEON, *Examiner.*